UNITED STATES PATENT OFFICE.

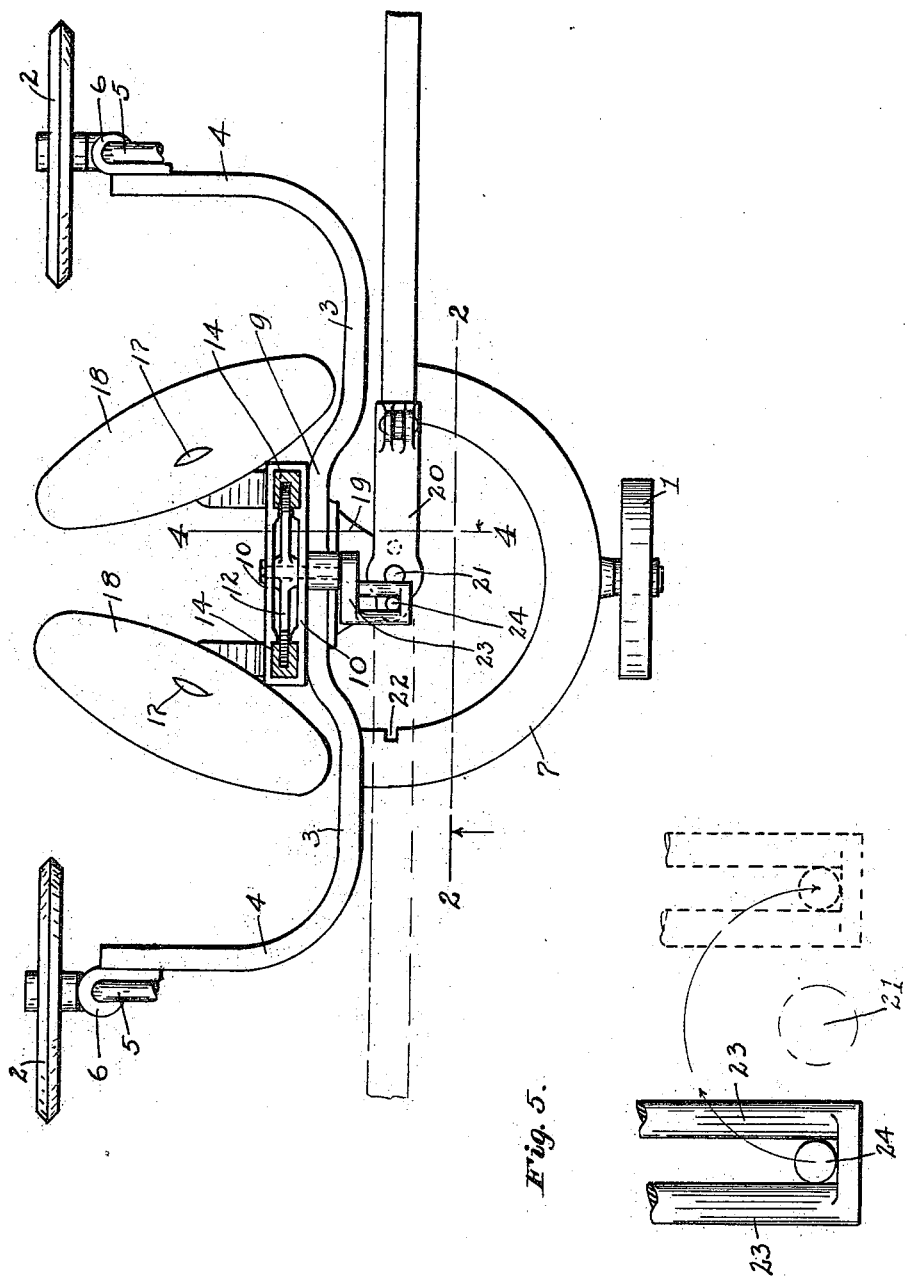

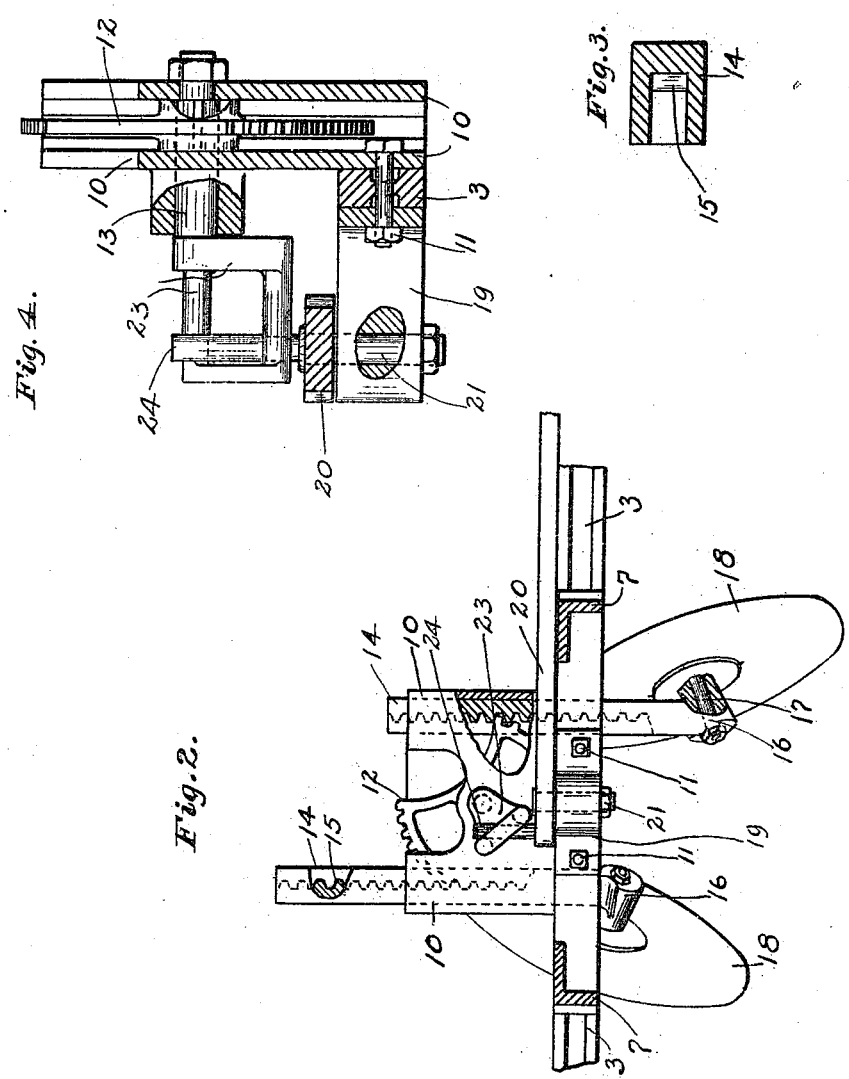

JUDSON BUCHANAN, OF CHATTANOOGA, TENNESSEE.

PLOW.

962,195.  Specification of Letters Patent.  Patented June 21, 1910.

Application filed January 11, 1909. Serial No. 471,589.

*To all whom it may concern:*

Be it known that I, JUDSON BUCHANAN, a citizen of the United States, residing at Chattanooga, in the county of Hamilton and State of Tennessee, have invented a new and useful Improvement in Plows, of which the following is a specification, reference being had to the accompanying drawing.

My improvement relates to plows having revolving mold-boards, and particularly to side-hill or reversible rotary mold-board plows in which two rotary mold-boards are used, one being in action while the plow is moving in one direction and the other being in action while the plow is moving in the opposite direction.

The object of the invention is to produce such a plow embodying efficient means for raising one of the two rotary mold-boards or disks while the other is being lowered. And the present invention is limited to means for such simultaneous movement of said disks and is a modification of the mechanism made the subject-matter of my Patent, No. 910,496, dated January 26, 1909, and of the mechanism made the subject-matter of my application, Serial No. 470,045, filed December 30, 1908.

The present invention adds to the invention of the last mentioned application means for raising and lowering said disks by the horizontal turning of the draft tongue for the reversal of the direction of draft.

In the accompanying drawings, Figure 1 is a plan of a plow embodying my improvement; Fig. 2 is a longitudinal upright section on the line 2—2 of Fig. 1, looking in the direction of the arrow; Fig. 3 is a horizontal section of one of the disk posts; Fig. 4 is a section on the line 4—4 of Fig. 1, looking toward the left; Fig. 5 is a detail view illustrating the engagement between the tongue and the crank of the oscillating gear shaft.

Referring to said drawings, 1 is the land wheel and 2, 2 are the furrow wheels ordinarily used in such plows. Said wheels constitute the carrying wheels of the plow.

The frame, in the form shown, comprises the beam, 3, having its ends, 4, turned laterally, and the furrow wheels, 2, are secured to said ends by means of crank-form axles, 5, resting in upright bearings, 6. These wheels and the manner of their attachment may be of any well known form. My present improvement does not relate to them. The middle of the beam, 3, is shown bent laterally toward the same side as are the ends, 4, to form a laterally extended portion, 9. The frame further comprises a horizontal, semi-circular section, 7, secured to the rear side of the beam (the side toward the land wheel, 1), and the land wheel is secured to said semi-circular piece. From said portion, 9, of the beam rises an upright housing, 10, in which the disk posts are confined and have their up and down movement, said housing forming ways for said posts. Said housing is rectangular and oblong in horizontal cross section and open above and below and has its lower end applied flatwise against the front side of the beam, and bolts, 11, extend through said housing and said beam and rigidly secure said housing to the beam.

To the rear face of the laterally extended portion, 9, of the beam, 3, is applied a horizontal bracket piece, 19, and at the center of said semi-circular frame section, 7, a tongue, 20, is hinged to said bracket piece by means of an upright journal, 21, whereby said tongue is free to swing horizontally through half a circle across said semi-circular portion, 7, of the frame for the purpose of reversing the draft. In Fig. 1, said tongue is set for draft toward the right. Said tongue may be secured in either of its two positions by any suitable means, as, for example, a latch mechanism (not shown) engaging notches, 22, in said semi-circular piece, 7. Said latch mechanism does not constitute a portion of the present invention, and hence I deem it unnecessary to illustrate and describe the same.

A shaft, 13, extends horizontally and from front to rear through the housing, 10, and on the rear end of said shaft is a slotted crank, 23, said crank being so placed as to oscillate horizontally beneath the axial line of said shaft. Within said housing, said shaft is surrounded by and keyed to an oscillating gear, 12.

At each side of said gear, 12, is an upright disk post, 14, of angular cross section and of proper dimensions to fit slidably in said housing, and channeled at the side of said gear to receive the latter and having gear teeth, 15, in said channel meshing with the teeth at that side of said gear. Thus said two disk posts are supported by said gear and adapted to move simultaneously therewith, the movement of said gear being oscillatory while the movement of said posts is in upright lines. The lower end of each disk post is turned horizontally forward, and each such end supports a bearing, 16, which receives a journal, 17, on a disk, 18, said journals being, respectively, so directed as to place the disks in a line parallel to the draft line and directed oppositely and away from each other, at proper angles, conformably to the opposite drafts.

An upright post, 24, rises from the tongue, 20, at a little distance from the journal of said tongue and at the side of the latter opposite the body of the tongue, and extends into the slot of said crank. Said slot is approximately parallel to the axis of the crank and long enough to permit said post to move in a semi-circle from one side of the journal, 21, to the other side of said journal (see Figs. 1 and 5). And the relative dimensions of these parts are such as that when the tongue reaches either limit, the crank, 23, will bear against each side of said post, whereby said crank is locked against further movement in one direction, and the locking of such crank locks the disk posts in the position which they then occupy. Thus the action of this disk raising and lowering mechanism is made entirely automatic.

I claim as my invention:

1. In a rotary mold-board plow, the combination with carrying wheels and a frame adapted for two-way draft, of two disks directed oppositely and movable up and down, a reversible tongue, and means intermediate said tongue and said disks for alternately raising and lowering the latter by the reversal of said tongue.

2. In a rotary mold-board plow, the combination with carrying wheels and a frame adapted for two-way draft, of two disks in a line parallel to the draft line and directed oppositely and movable up and down, a reversible tongue having one end hinged to said frame for horizontal movement through half a circle, and means intermediate said tongue and said disks for alternately raising and lowering the latter by the reversal of said tongue.

3. In a rotary mold-board plow, the combination with carrying wheels and a frame adapted for two-way draft, of two disks directed oppositely, vertically slidable posts supporting said disks, a reversible tongue, and means intermediate said tongue and said posts for alternately raising and lowering the latter by the reversal of said tongue.

4. In a rotary mold-board plow, the combination with carrying wheels and a frame adapted for two-way draft, of two disks directed oppositely, vertically slidable posts supporting said disks, an oscillatory member engaging said posts, a reversible tongue, and means intermediate said tongue and said oscillatory member for oscillating said oscillatory member.

5. In a rotary mold-board plow, the combination with carrying wheels and a frame adapted for two-way draft, of two disks directed oppositely, vertically slidable posts supporting said disks, an oscillatory gear engaging said posts, a reversible tongue, and means intermediate said tongue and said oscillatory gear for oscillating said oscillatory gear.

6. In a rotary mold-board plow, the combination with carrying wheels and a frame adapted for two-way draft, of two disks directed oppositely, vertically slidable posts supporting said disks, an oscillatory member engaging said disks, a shaft supporting said oscillatory member, a reversible tongue, and means intermediate said tongue and said shaft for partially rotating the latter.

7. In a rotary mold-board plow, the combination with carrying wheels and a frame adapted for two-way draft, of two disks directed oppositely, vertically slidable posts supporting said disks, an oscillatory gear engaging said disks, a shaft supporting said oscillatory gear, a reversible tongue, and means intermediate said tongue and said shaft for partially rotating the latter.

8. In a rotary mold-board plow, the combination with carrying wheels and a frame adapted for two-way draft, of two disks directed oppositely, vertically slidable posts supporting said disks, an oscillatory member engaging said disks, a shaft supporting said oscillatory member, a crank on said shaft, a reversible tongue, and means on said tongue for engaging said crank.

9. In a rotary mold-board plow, the combination with carrying wheels and a frame adapted for two-way draft, of two disks directed oppositely and adjustable up and down, an oscillatory shaft, means connecting said shaft and said disks, a reversible tongue, and means intermediate said tongue and said shaft for partially rotating the latter.

10. In a rotary mold-board plow, the combination with carrying wheels and a frame adapted for two-way draft, of two disks directed oppositely and adjustable up and down, an oscillatory shaft, means connecting said shaft and said disks, a crank on said shaft, a reversible tongue in operative relation with said crank.

11. In a wheeled plow, a support having wheels and adapted for two-way draft, a plurality of mold-boards carried by said support and alining one with another, and a reversible draft-member connecting with said boards for automatically effecting alternate positioning of one or another of said moldboards.

12. In a wheeled plow, a supporting member having wheels and adapted for two-way draft, mold-boards operative in opposite directions relative to the line of draft, a draft member mounted on said member and reversible from one end to the other to change the direction of travel, and means operable by the draft-member to effect alternate positioning of said mold-boards alternately toward and away from the ground.

13. In a wheeled plow, a supporting member having wheels and adapted for two-way draft, mold-boards operative in opposite directions relative to the line of draft, a draft member mounted on said member and reversible from one end to the other to change the direction of travel, and automatic means operable by the draft-member to effect alternate positioning of said mold-boards alternately toward and away from the ground.

14. In a wheeled plow, a supporting member having wheels and adapted for two-way draft, mold-boards operative in opposite directions relative to the line of draft, a draft member mounted on said member and reversible from one end to the other to change the direction of travel, and means operable by the reversing movement of the draft member to effect alternate positioning of said mold-boards alternately toward and away from the ground.

15. In a wheeled plow, a support having wheels and adapted for two-way draft, two rotary mold-boards adjustably mounted on said support, a reversible draft-member, and connections between said draft member and the moldboards whereby, when said draft-member is reversed, the mold-boards are alternately and automatically adjusted toward and away from the ground.

16. In a wheeled plow, a support having wheels and adapted for two-way draft, two rotary disks carried by said support and alining with each other, and a reversible draft-beam connecting with said disks for effecting automatic and alternate positioning of one or the other of said disks toward and away from the ground.

17. In a wheeled plow, a support adapted for two-way draft, two disks carried by said support, and a swinging draft-member connecting with said disks for automatically raising one disk and lowering the other.

In testimony whereof I have signed my name, in presence of two witnesses, this 31st day of December, in the year one thousand nine hundred and eight.

JUDSON BUCHANAN.

Witnesses:
GEORGE FREEMAN,
CHARLES F. MINTURN.